US008486561B2

(12) United States Patent
Tsukamoto et al.

(10) Patent No.: US 8,486,561 B2
(45) Date of Patent: Jul. 16, 2013

(54) ELECTROCHEMICAL DEVICE AND MANUFACTURING METHOD THEREOF

(75) Inventors: Naoto Tsukamoto, Tokyo (JP); Kiyoshi Uchida, Tokyo (JP); Hiroaki Hasegawa, Tokyo (JP)

(73) Assignee: TDK Corporation, Tokyo (JP)

( * ) Notice: Subject to any disclaimer, the term of this patent is extended or adjusted under 35 U.S.C. 154(b) by 298 days.

(21) Appl. No.: 12/951,150

(22) Filed: Nov. 22, 2010

(65) Prior Publication Data

US 2011/0129726 A1    Jun. 2, 2011

(30) Foreign Application Priority Data

Nov. 27, 2009    (JP) ................. P2009-270666

(51) Int. Cl.
*H01M 2/02*    (2006.01)
(52) U.S. Cl.
USPC .......................................... 429/178; 429/162
(58) Field of Classification Search
None
See application file for complete search history.

(56) References Cited

U.S. PATENT DOCUMENTS 6,902,844 B2    6/2005    Yageta et al.

FOREIGN PATENT DOCUMENTS

| JP | A 11-329397 | 11/1999 |
|---|---|---|
| JP | A 2000-077044 | 3/2000 |
| JP | A 2000-285903 | 10/2000 |
| JP | A 2002-170532 | 6/2002 |
| JP | A-2002-231217 | 8/2002 |
| JP | A-2002-246269 | 8/2002 |
| JP | A-2003-86152 | 3/2003 |
| JP | A-2003-86153 | 3/2003 |
| JP | A-2003-242961 | 8/2003 |
| JP | A-2007-18766 | 1/2007 |
| JP | A-2008-103294 | 5/2008 |

OTHER PUBLICATIONS

Machine translation of JP 2000-077044, retrieved from <http://www19.ipdl.inpit.go.jp/PA1/cgi-bin/PA1INIT?1357151315518> on Dec. 31, 2012.*

* cited by examiner

*Primary Examiner* — Cynthia Walls
(74) *Attorney, Agent, or Firm* — Oliff & Berridge, PLC

(57) ABSTRACT

An electrochemical device according to the present invention has an outer package including a metal film; a battery element enclosed in the outer package; resin layers provided at least inside a sealing region of the outer package; and a lead extending from the battery element through between the resin layers in the sealing region of the outer package to the outside of the outer package, and a shape of the lead in the sealing region includes front and back surfaces both consisting of curved surfaces. In the sealing region, a maximum thickness Z1 of the lead near a lateral center position of the lead and a thickness Z11 at a lateral end position of the lead satisfy the relation of Z11<Z1. This electrochemical device comes to have high quality.

6 Claims, 15 Drawing Sheets

Fig.2
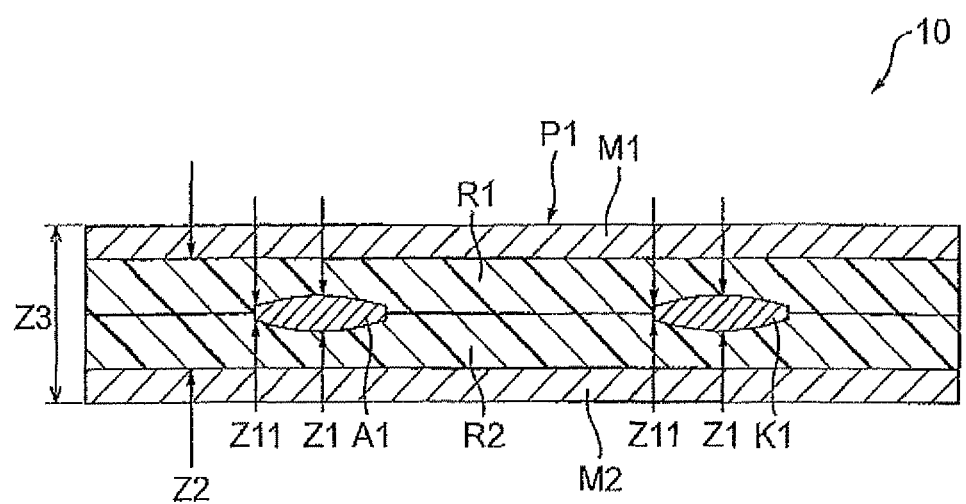
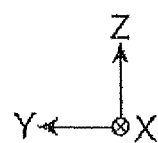

Fig.5
(A)
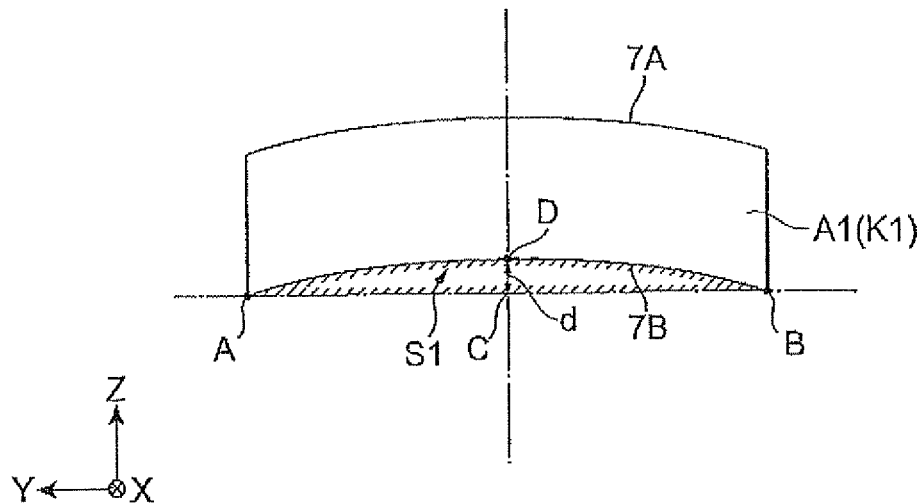
(B)
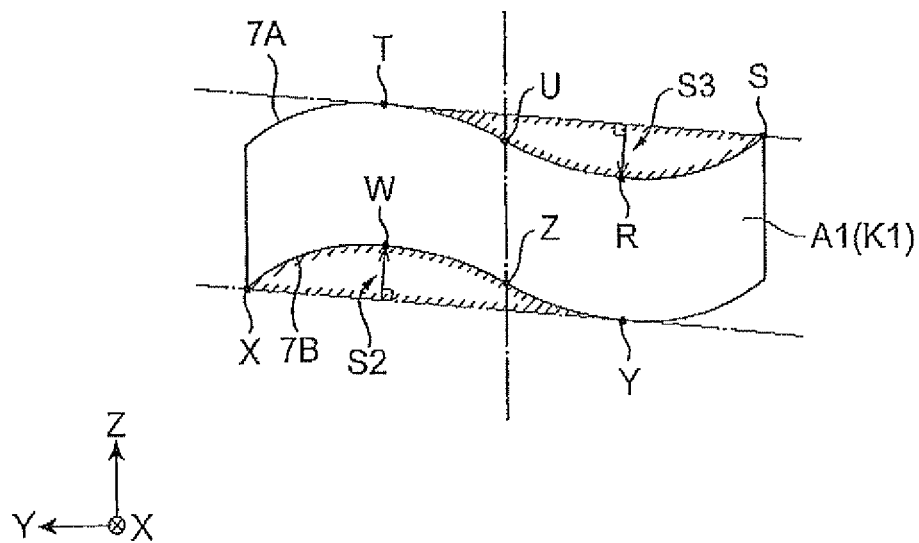

| $Z_1(\mu m)$ \ $Z_{11}/Z_1(\%)$ | 100 | 80 | 60 | 50 | 40 | 20 | 10 |
|---|---|---|---|---|---|---|---|
| 100 | 60(×) | 95(○) | 95(○) | 95(○) | 90(○) | 10(×) | 10(×) |
| 80 | 65(○) | 95(○) | 100(○) | 100(○) | 95(○) | 10(×) | 0(×) |
| 60 | 65(○) | 90(○) | 85(○) | 75(○) | 60(×) | 5(×) | 0(×) |
| 40 | 70(○) | 70(○) | 50(×) | 45(×) | 40(×) | 0(×) | 0(×) |

(B)

| $Z_1(\mu m)$ \ $Z_{11}/Z_1(\%)$ | 100 | 80 | 60 | 50 | 40 | 20 | 10 |
|---|---|---|---|---|---|---|---|
| 100 | 60(×) | 90(○) | 100(○) | 95(○) | 90(○) | 15(×) | 15(×) |
| 80 | 70(○) | 100(○) | 100(○) | 100(○) | 95(○) | 15(×) | 0(×) |
| 60 | 70(○) | 95(○) | 90(○) | 75(○) | 65(×) | 5(×) | 0(×) |
| 40 | 75(○) | 70(○) | 50(×) | 45(×) | 35(×) | 0(×) | 0(×) |

(C)

| $Z_1(\mu m)$ \ $Z_{11}/Z_1(\%)$ | 100 | 80 | 60 | 50 | 40 | 20 | 20 |
|---|---|---|---|---|---|---|---|
| 100 | 70(×) | 100(○) | 100(○) | 100(○) | 100(○) | 20(×) | 0(×) |
| 80 | 80(○) | 100(○) | 100(○) | 100(○) | 100(○) | 20(×) | 0(×) |
| 60 | 80(○) | 100(○) | 100(○) | 80(○) | 70(×) | 5(×) | 0(×) |
| 40 | 75(○) | 80(○) | 60(×) | 50(×) | 4(×) | 0(×) | 0(×) |

Fig.11

RANK(A)

| SAMPLE NUMBER | Z1 ($\mu$m) | Z11 ($\mu$m) | $\beta$ (%) |
|---|---|---|---|
| 18 | 150 | 100 | 71.1 |
| 37 | 250 | 120 | 71.9 |
| 51 | 500 | 75 | 73.8 |
| 50 | 500 | 100 | 74.0 |
| 72 | 1000 | 150 | 76.1 |
| 60 | 750 | 150 | 76.1 |
| 38 | 250 | 100 | 76.5 |
| 62 | 750 | 100 | 77.4 |
| 61 | 750 | 120 | 78.2 |
| 27 | 200 | 100 | 78.2 |
| 39 | 250 | 75 | 79.8 |
| 49 | 500 | 120 | 81.6 |
| 28 | 200 | 75 | 81.7 |
| 19 | 150 | 75 | 82.7 |
| 73 | 1000 | 120 | 87.4 |

Fig.12

RANK(B)

| SAMPLE NUMBER | Z1 ($\mu$m) | Z11 ($\mu$m) | $\beta$ (%) |
|---|---|---|---|
| 11 | 100 | 100 | 40.0 |
| 64 | 750 | 50 | 40.8 |
| 8 | 75 | 50 | 42.1 |
| 40 | 250 | 50 | 42.6 |
| 20 | 150 | 50 | 42.9 |
| 13 | 100 | 50 | 44.6 |
| 17 | 150 | 120 | 45.1 |
| 86 | 1500 | 100 | 45.4 |
| 29 | 200 | 50 | 47.0 |
| 52 | 500 | 50 | 47.1 |
| 95 | 2000 | 180 | 49.3 |
| 12 | 100 | 75 | 52.5 |
| 85 | 1500 | 120 | 55.1 |
| 75 | 1000 | 75 | 57.6 |
| 59 | 750 | 180 | 60.5 |
| 48 | 500 | 150 | 64.6 |
| 71 | 1000 | 180 | 65.3 |
| 83 | 1500 | 180 | 65.5 |
| 63 | 750 | 75 | 66.4 |
| 26 | 200 | 120 | 67.0 |
| 84 | 1500 | 150 | 67.3 |
| 74 | 1000 | 100 | 68.9 |

Fig.13

RANK(C)

| SAMPLE NUMBER | Z1 ($\mu$m) | Z11 ($\mu$m) | $\beta$ (%) |
|---|---|---|---|
| 81 | 1500 | 220 | 21.8 |
| 98 | 2000 | 100 | 22.3 |
| 57 | 750 | 220 | 23.0 |
| 69 | 1000 | 220 | 23.3 |
| 87 | 1500 | 75 | 23.8 |
| 65 | 750 | 25 | 23.8 |
| 16 | 150 | 150 | 25.4 |
| 4 | 50 | 50 | 26.2 |
| 94 | 2000 | 200 | 26.4 |
| 14 | 100 | 25 | 27.5 |
| 9 | 75 | 25 | 28.1 |
| 97 | 2000 | 120 | 30.4 |
| 53 | 500 | 25 | 30.4 |
| 25 | 200 | 150 | 31.0 |
| 21 | 150 | 25 | 31.6 |
| 34 | 250 | 200 | 31.7 |
| 46 | 500 | 200 | 32.0 |
| 41 | 250 | 25 | 32.7 |
| 82 | 1500 | 200 | 33.1 |
| 30 | 200 | 25 | 33.4 |
| 70 | 1000 | 200 | 34.6 |
| 58 | 750 | 200 | 35.3 |
| 35 | 250 | 180 | 35.3 |
| 76 | 1000 | 50 | 36.6 |
| 96 | 2000 | 150 | 37.4 |
| 36 | 250 | 150 | 37.8 |
| 47 | 500 | 180 | 38.6 |
| 7 | 75 | 75 | 39.2 |

Fig.14

RANK(D)

| SAMPLE NUMBER | Z1 (μm) | Z11 (μm) | β (%) |
|---|---|---|---|
| 103 | 2500 | 260 | 3.1 |
| 43 | 500 | 260 | 3.4 |
| 91 | 2000 | 260 | 4.1 |
| 55 | 750 | 260 | 4.4 |
| 104 | 2500 | 240 | 4.7 |
| 32 | 250 | 240 | 5.8 |
| 105 | 2500 | 220 | 7.1 |
| 79 | 1500 | 260 | 8.4 |
| 92 | 2000 | 240 | 8.7 |
| 44 | 500 | 240 | 8.7 |
| 110 | 2500 | 100 | 8.8 |
| 67 | 1000 | 260 | 9.8 |
| 106 | 2500 | 200 | 11.0 |
| 109 | 2500 | 120 | 11.9 |
| 100 | 2000 | 50 | 12.3 |
| 80 | 1500 | 240 | 13.5 |
| 108 | 2500 | 150 | 14.4 |
| 77 | 1000 | 25 | 15.0 |
| 68 | 1000 | 240 | 16.0 |
| 56 | 750 | 240 | 16.2 |
| 99 | 2000 | 75 | 16.8 |
| 23 | 200 | 200 | 17.0 |
| 88 | 1500 | 50 | 17.3 |
| 33 | 250 | 220 | 17.8 |
| 2 | 25 | 25 | 17.9 |
| 93 | 2000 | 220 | 18.5 |
| 107 | 2500 | 180 | 18.6 |
| 24 | 200 | 180 | 19.2 |
| 5 | 50 | 25 | 19.2 |
| 45 | 500 | 220 | 19.6 |

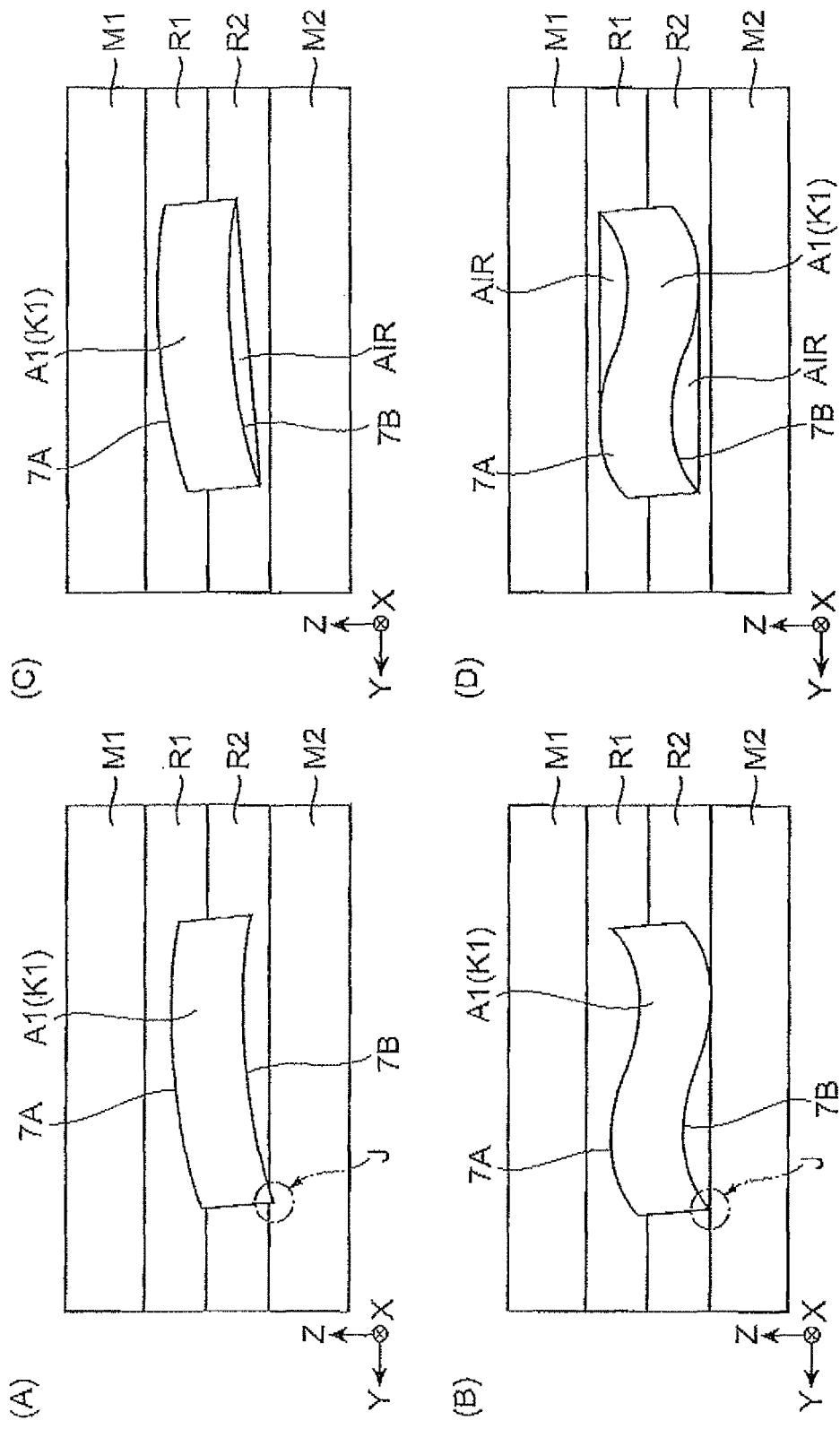

ELECTROCHEMICAL DEVICE AND MANUFACTURING METHOD THEREOF

BACKGROUND OF THE INVENTION

1. Field of the Invention

The present invention relates to an electrochemical device and a method for manufacturing the same.

2. Related Background Art

A conventional electrochemical device has a structure in which a battery element such as a lithium-ion battery (LIB) or an electric double layer capacitor (EDLC) is enclosed in an outer package comprised of aluminum. Specifically, it was made by placing the battery element in the outer package comprised of an aluminum laminate, introducing an electrolytic solution, as needed, into the outer package, and sealing a peripheral region of the outer package.

Leads of an anode and a cathode extend from the battery element, and each of them extends through a gap in a sealing region of the outer package to the outside. Resin layers are provided inside the aluminum laminate and the sealing is implemented by thermocompression bonding of the sealing region. Several studies have been conducted on the structure between the sealing region and the leads, Patent Literature 1 below describes an inventive technique of increasing the bond area in such location by providing the leads in the sealing region with a plurality of holes. Patent Literature 2 below describes an inventive technique of increasing the bond area in such location by decreasing the width of the leads in the sealing region. Other related technologies are described in Patent Literatures 3 to 7.

PRIOR TECHNICAL LITERATURES

Patent Literatures

Patent Literature 1: Japanese Patent Application Laid-open No. 2003-86153
Patent Literature 2: Japanese Patent Application Laid-open No. 2003-86152
Patent Literature 3: Japanese Patent Application Laid-open No. 2002-231217
Patent Literature 4: Japanese Patent Application Laid-open No. 2002-246269
Patent Literature 5: Japanese Patent Application Laid-open No. 2003-242961
Patent Literature 6: Japanese Patent Application Laid-open No. 2007-18766
Patent Literature 7: Japanese Patent Application Laid-open No. 2008-103294

SUMMARY OF ME INVENTION

However, according to Inventors' knowledge, there are cases where unevenness such as burrs on the surfaces of the leads scratches the resin layers inside the outer package to reach the metal film so as to form short and leak paths, and cases where the resin layers fail to fill the interior of spaces in the curved surfaces during the thermocompression bonding. The inventors found that these caused the inner liquid or gas to leak or caused the leads to short-circuit with a lapse of time in many cases, resulting in producing defective products, and that these posed the problem of failure in obtaining high-quality electrochemical devices.

The present invention has been accomplished in view of the above-described problem and it is an object of the present invention to provide a high-quality electrochemical device and a manufacturing method thereof.

In order to solve the above problem, an electrochemical device according to the present invention is an electrochemical device comprising: an outer package including a metal film; a battery element enclosed in the outer package; resin layers provided at least inside a sealing region of the outer package; and a lead extending from the battery element through between the resin layers in the sealing region of the outer package to the outside of the outer package, wherein a shape of the lead in the sealing region includes a front surface and a back surface consisting of first and second curved surfaces, respectively, which are opposed to each other, wherein a fast intersecting line between the first surface and a plane perpendicular to a longitudinal direction of the lead consists of a continuous first curve convex in a direction away from the lead, and wherein a second intersecting line between the second surface and the plane perpendicular to the longitudinal direction of the lead consists of a continuous second curve convex in a direction away from the lead.

In the sealing region, a maximum thickness $Z1$ (µm) of the lead near a lateral center position of the lead and a thickness $Z11$ (µm) of the lead at a lateral end position of the lead satisfy the following relational expression or expressions.

For the first quality rank (RANK (D)), the relational expression to be satisfied is the following condition.

$$Z11 < Z1$$

For the second quality rank (RANK (C)) of better quality; the relational expressions to be satisfied are the following conditions.

$$Z11 < Z1$$

$$Z11 \geq -3.20 \times 10^{-5} Z1^2 + 7.20 \times 10^{-2} Z1 + 184$$

$$Z11 \geq 1.98 \times 10^{-5} Z1^2 + 4.72 \times 10^{-4} Z1 + 23.5$$

For the third quality rank (RANK (B)) of much better quality, the relational expressions to be satisfied are the following conditions.

$$Z11 < Z1$$

$$Z11 < 34.54 \times \ln(Z1) - 48.87$$

$$Z11 > 25 \times \exp(9.51 \times 10^{-4} Z1)$$

$$Z11 < 200$$

For the fourth quality rank (RANK (A)) of far better quality, the relational expressions to be satisfied are the following conditions.

$$Z11 < Z1$$

$$Z11 \leq -1.09 \times 10^{-4} Z1^2 + 0.18 Z1 + 78.1$$

$$Z11 \geq 8.39 \times 10^{-5} Z1^2 - 4.17 \times 10^{-2} Z1 + 79.4$$

In this electrochemical device, the front surface and the back surface both consist of the curved surfaces and, preferably, the thickness of the lateral end is set smaller than that near the central region ($Z11 < Z1$). Therefore, the lead has no substantially pointed portion, thereby achieving an effect to prevent the surrounding resin layers from being damaged. Since the device satisfies the foregoing relational expressions, it has an effect to maintain the strength of the lead during the thermocompression bonding.

The thickness $Z11$ is preferably not less than 15 µm and more preferably not less than 25 µm. Namely, if the thickness of the lead end is extremely thin, it will result in increasing a probability of cutting the lead during the thermocompression bonding. In the present invention, therefore, the end thickness Z11 is set to be not less than 15 μm, so as to decrease the probability of cutting.

A method for manufacturing the above-described electrochemical device comprises: a step of processing at least a region of the lead located in the sealing region, by roll press to deform the front surface and the back surface of the lead into the curved surfaces; and a step of placing the lead with the front surface and the back surface of the curved surfaces, between the resin layers in the sealing region, and performing thermocompression bonding of the lead and the resin layers together with the outer package.

In this case, the resin layers soften during the thermocompression bonding to adhere to the periphery of the lead and, because the front and back surfaces of the lead are preliminarily curved by the roll press processing, the resin layers are prevented from being damaged, which leads to manufacture of the high-quality electrochemical device.

In the manufacturing method of the electrochemical device according to the present invention, preferably, a pressure $P_P$ in the processing by roll press and a pressure $P_T$ in the thermocompression bonding satisfy the following relation: $P_P > P_T$. Namely, when the roll press is carried out at the pressure higher than that in the ordinary thermo compression bonding, the lead can be deformed so as to form the curved surfaces.

In the manufacturing method of the electrochemical device according to the present invention, the pressure $P_P$ in the processing by roll press and the pressure $P_T$ in the thermocompression bonding preferably satisfy the following relations: $1.96 \times 10^5$ Pa $\leq P_P \leq 5.88 \times 10^5$ Pa and $0.98 \times 10^5$ Pa $\leq P_T \leq 3.92 \times 10^5$ Pa. In this case, the method provides an effect to enable execution of the thermocompression bonding while maintaining the lead shape in the press processing of the lead.

The present invention thus provides the high-quality electrochemical device.

BRIEF DESCRIPTION OF THE DRAWINGS

FIG. 2 is a cross-sectional view of the electrochemical device shown in FIG. 1, along a line and in a direction of arrows II-II.

FIG. 5 includes (A) a vertical cross-sectional view of a lead curved in one direction, and (B) a vertical cross-sectional view of a lead curved S-shape.

FIG. 9 includes tables showing yields (%) with changes in percentage (%) of thickness Z11 of the lateral end to thickness Z1, and in maximum thickness Z1 near the central region.

FIG. 11 is a table showing a relation of thicknesses Z1, Z11 and yield β.

FIG. 12 is a table showing a relation of thicknesses Z1, Z11 and yield β.

FIG. 13 is a table showing a relation of thicknesses Z1, Z11 and yield β.

FIG. 14 is a table showing a relation of thicknesses Z1, Z11 and yield β.

FIG. 15 is vertical cross-sectional views of leads in cases of various conditions.

DESCRIPTION OF THE PREFERRED EMBODIMENTS

The electrochemical device according to an embodiment will be described below. In the description, the same elements will be denoted by the same reference signs, without redundant description.

Figure 1:
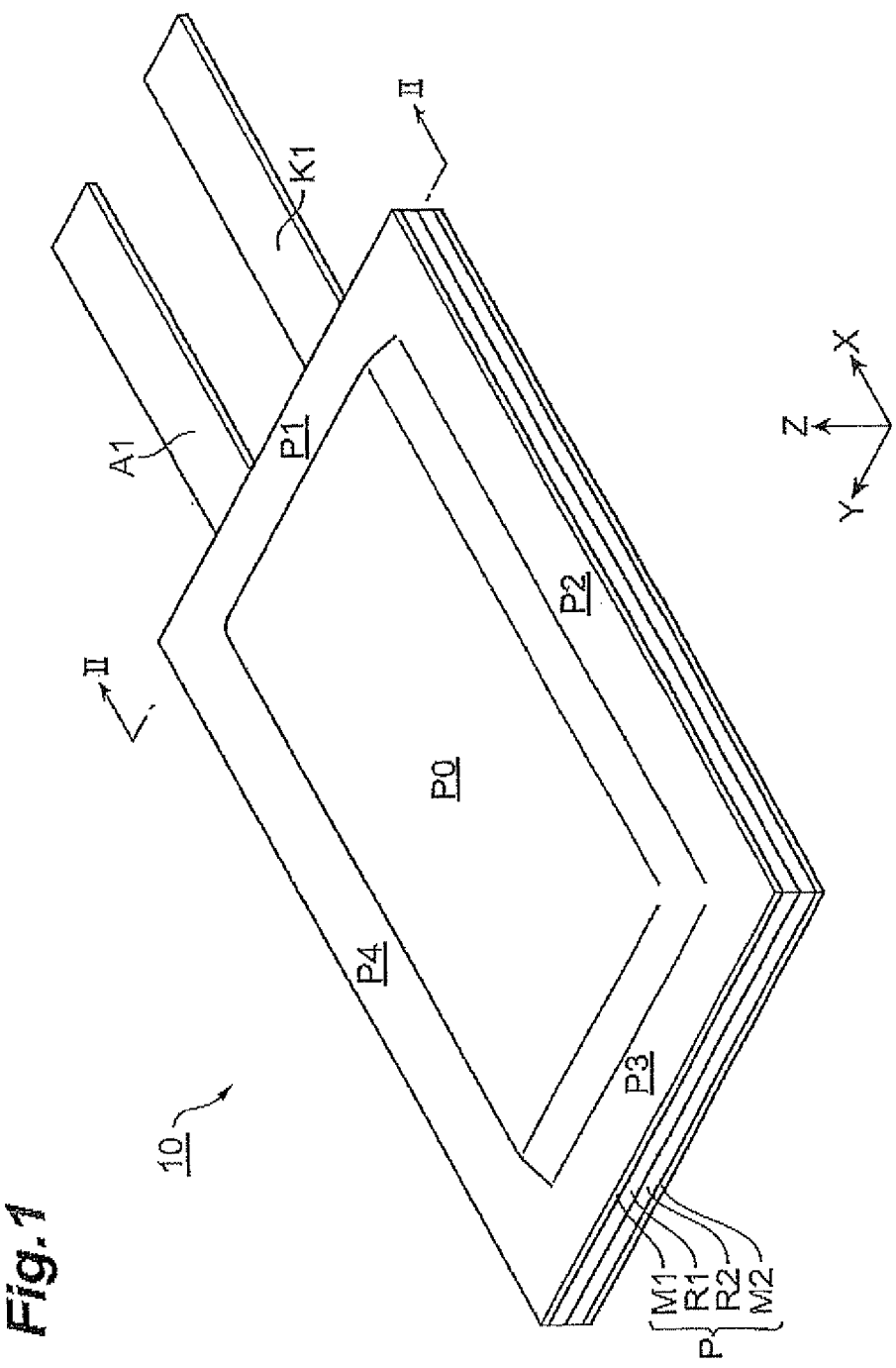
FIG. 1 is a perspective view of an electrochemical device.
Figure 3:
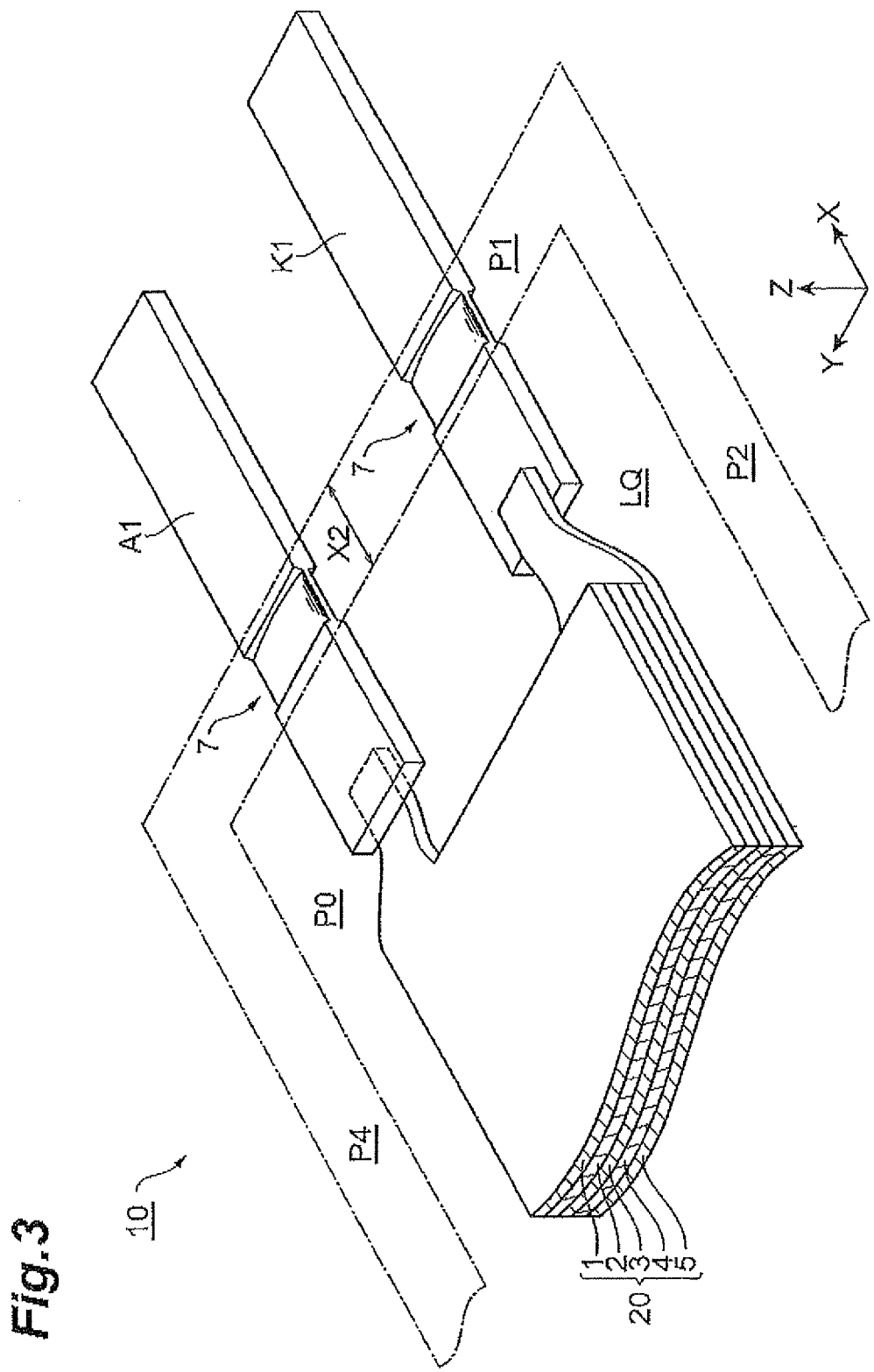
FIG. 3 is an enlarged perspective view of a part near a sealing region of the electrochemical device.

FIG. 1 is a perspective view of the electrochemical device, FIG. 2 is a cross-sectional view of the electrochemical device shown in FIG. 1, in a line and along a direction of arrows II-II, and FIG. 3 is an enlarged perspective view of a part near a sealing region of the electrochemical device. In these drawings, as shown, an XYZ three-dimensional orthogonal coordinate system is set.

This electrochemical device is an electric double layer capacitor (EDLC) and has an outer package P including metal films M1, M2, a battery element 20 (of FIG. 3) enclosed in the outer package P, resin layers R1, R2 (cf. FIG. 2) provided at least inside a sealing region (top seal part) P1 of the outer package P, and leads A1, K1 extending from the battery element 20 through between the resin layers R1, R2 in the sealing region P1 of the outer package P to the outside of the outer package P. The leads A1, K1 extend along the X-axis direction, the width direction thereof coincides with the Y-axis, and the thickness direction thereof coincides with the Z-axis.

The resin layers R1, R2 are bonded to the entire inside surfaces of the metal films M1, M2, but these may be provided on the metal films M1, M2 in portions located in sealing regions P1, P2, P3, and P4 around the four sides of the rectangular outer package P. These sealing regions P1, P2, P3, P4 are sealed by thermocompression bonding. The battery element 20 is placed in a central region P0 surrounded by the sealing regions P1, P2, P3, P4 on the four sides of the outer package P. The battery element 20 can be charged by applying a voltage between the lead A1 as an anode and the lead K1 as a cathode, or charged power in the battery element 20 can be taken out thereof.

Referring to FIG. 2, let Z1 be the maximum thickness near the lateral center part of the lead A1 (K1) in the sealing region P1, Z11 be the thickness of the lateral end thereof, Z2 be the total thickness of the resin layers R1, R2, and Z3 be the total thickness of the outer package. In this case, the relation of Z11<Z1 is satisfied by the maximum thickness Z1 of the lead A1 (K1) near the lateral center position of the lead A1 (K1) and the thickness Z11 at the lateral end position of the lead A1 (K1), in the sealing region P1.

The shape of the lead A1 (K1) in the sealing region P1 includes a front surface 7A and a back surface 7B consisting of a first curved surface and a second curved surface, respectively, which are opposed to each other (cf. FIG. 4), a first intersecting line (the top surface of the lead in the YZ section in FIG. 2) between the first surface 7A and a plane (YZ plane) perpendicular to the longitudinal direction (X-axis) of the lead consists of a continuous first curve convex in a direction away from the lead A1 (K1), and a second intersecting line (the bottom surface of the lead in the YZ section in FIG. 2) between the second surface (7B in FIG. 4) and the plane (YZ plane) perpendicular to the longitudinal direction (X-axis) of the lead consists of a continuous second curve convex in a direction away from the lead A1 (K1).

In this electrochemical device, the front surface and the back surface (the top surface and bottom surface of the lead) both consist of the curved surfaces and the thickness of the lateral end is set smaller than that near the central region. Therefore, the leads have no substantially pointed portion and thus provide an effect to prevent the surrounding resin layers R1, R2 from being damaged. Since the end thickness Z11 is smaller than the thickness Z1 near the central region, this configuration decreases the possibility that the ends damage the resin layers, so as to improve the yield. Furthermore, the conventional devices had the factors to decrease the yield, e.g., insufficient sealing because of insufficient filling with resin near the lateral ends of the leads, whereas in the present embodiment the resin is more likely to also fully fill the regions near the lateral ends of the leads because the end thickness Z11 is not more than 40% of the thickness Z1 near the central region.

The thickness Z11 is preferably not less than 15 μm. Namely, an extreme decrease in the thickness of the lead end will lead to sharpening at such locations and increase the probability of cutting of the leads during the thermocompression bonding. In the present embodiment, therefore, the end thickness Z11 is set to be not less than 15 μm and, more preferably, not less than 25 μm, thereby decreasing the possibility of cutting. Furthermore, this configuration can also prevent the resin layers from being damaged by virtue of sharpening of the ends.

There are an infinite number of conceivable structures for the battery element 20 shown in FIG. 3. The present embodiment adopts, as the anode (positive electrode)-side electrode, one obtained by coupling a collector 1 comprised of a metal foil of copper or the like, to a polarizable electrode 2 comprised of an activated carbonaceous structure. The cathode (negative electrode)-side electrode used herein is one obtained by coupling a collector 5 comprised of a metal foil of aluminum or the like, to a polarizable electrode 4 comprised of an activated carbonaceous structure. A separator 3 is interposed between these positive electrode and negative electrode. It is a matter of coarse that a plurality of battery elements may be stacked, but the present embodiment shows the example wherein only one battery element is housed, for simplicity.

The polarizable electrodes 2, 4 are comprised of a porous material and are produced by mixing a binder resin in activated carbon. The binder resin applicable herein can be a fluorine-containing polymer compound such as polytetrafluoroethylene, or a rubber-based polymer compound such as styrene-butadiene rubber. It is also possible to blend as an electroconductive aid, fine particles or fine fibers of carbon black, carbon nanotube, or graphite as occasion may demand.

The collectors 1, 5 applicable herein are those obtained by roughly processing surfaces of copper foil or aluminum foil by etching. There are an infinite number of electrode producing methods, including a method of adding the electroconductive aid and binder into activated carbon, forming a sheet of the mixture, and bonding the sheet to the collector electrodes, and a method of forming a slurry of activated carbon and applying it onto the collector electrodes.

The separator 3 is comprised, for example, of a nonwoven fabric or porous film containing 10% or more by weight of a polyolefin resin. The polarizable electrodes and the separator can be bonded to each other by applying pressure to the pair of polarizable electrodes under a temperature environment of not less than the softening temperature of the polyolefin resin.

The separator can also be a cellulose nonwoven fabric or an aramid fiber nonwoven fabric.

The electrolytic solution LQ to be filled in the outer package P is one of the known electrolytic solutions of an aqueous solution type or an organic type. A known solvent for the organic-type electrolytic solution is propylene carbonate or acetonitrile, and a known solute thereof is an ammonium salt, an amine salt, or an amidine salt.

As shown in FIG. 3, the collectors 1, 5 of the positive electrode and the negative electrode are coupled to the leads A1, K1, respectively. These may be comprised of an integral metal foil. Each of the leads A1, K1 is provided with a curved-surface processed portion 7 formed by roll press processing. The thicknesses of this portion are as described above, the thicknesses of this portion are set to be smaller than the thickness of the outside unprocessed portion, and a step is formed at a boundary between the unprocessed portion and the curved-surface processed portion 7. The curved-surface processed portion 7 is made by the first step of inserting the leads A1, K1 into a press machine with two flat opposed press surfaces, and pressing to flatten these, and by the subsequent second step of processing the flattened surfaces by roll press. Axes of cylindrical press surfaces used in the roll press are parallel to the X-axis direction and rolls rotate around the X-axis (cf. FIG. 6). Since the sealing region P1 and others are also processed by thermocompression bonding with a press machine, the press machine for thermocompression bonding conventionally available may be applied to the flattening process in the first step.

Figure 4:
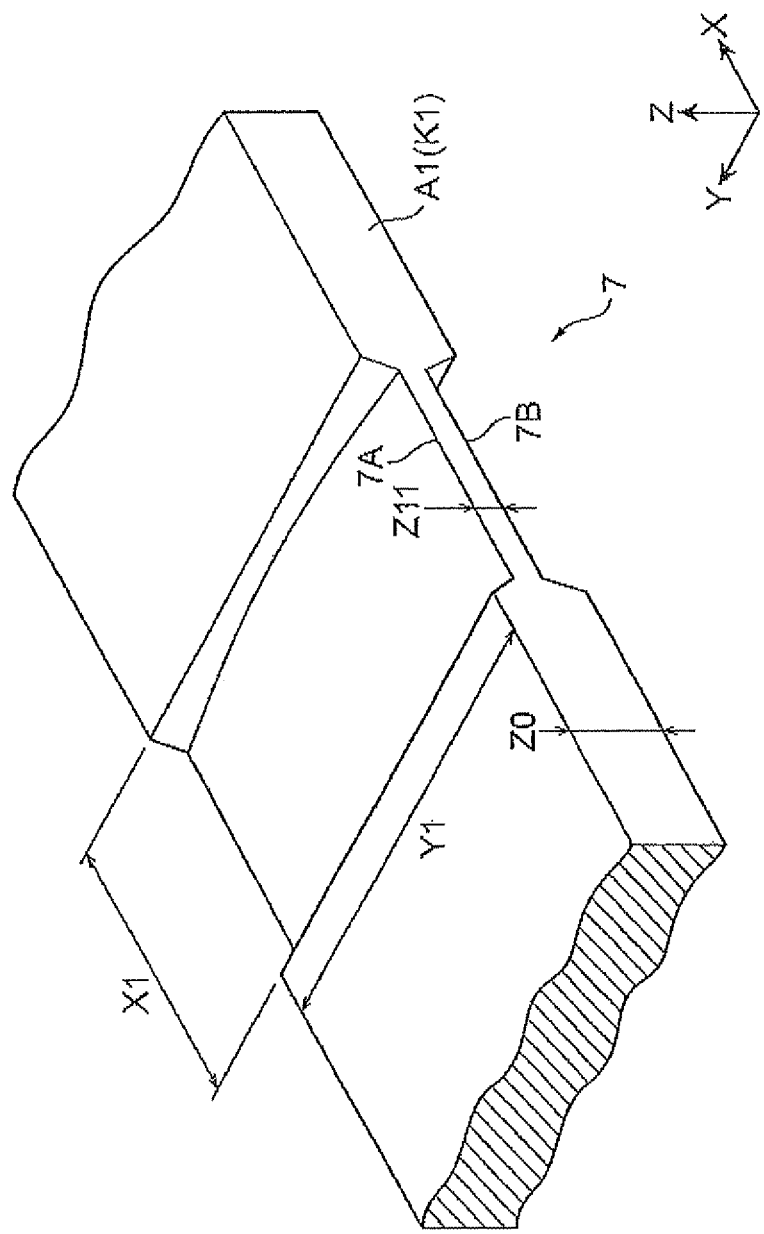
FIG. 4 is an enlarged perspective view of a curved-surface processed portion of a lead.

FIG. 4 is an enlarged perspective view of the curved-surface processed portion 7 of the lead.

The length X2 in the X-axis direction of the sealing region P1 shown in FIG. 3 is set to be a little longer than the length X1 in the X-axis direction of the curved-surface processed portion 7 shown in FIG. 4. Since the resin layers R1, R2 are provided in the entire region of the sealing region P1, the steps of the top and bottom surfaces of the curved-surface processed portion 7 penetrate into the resin layers R1, R2 to restrain movement in the X-axis direction of the lead A1 (K1), The width Y1 of the lead A1 (K1) is set, for example, to 3.5 mm.

The top surface (front surface) of the curved-surface processed portion 7 of the lead A1 (K1) is defined as 7A and the bottom surface (back surface) as 7B. These constitute an approximately cylindrical surface around the X-axis. The distance (thickness) between the top and bottom surfaces of the curved-surface processed portion 7 is Z1 near the central region and Z11 at the ends. The distance (thickness) between the top and bottom surfaces of the unprocessed portion is Z1 independent of positions. The relation of Z1<Z0 is satisfied. The value of Z0 is, for example, 100 μm and the value of Z1, for example, 80 μm.

The YZ sectional shape before the processing of the foregoing curved-surface processed portion 7 will be described in detail.

FIG. 5 (A) is a vertical cross-sectional view (YZ section) of a lead curved in one direction and FIG. 5 (B) a vertical cross-sectional view (YZ section) of a lead curved in S-shape. The lead is formed by urging two blades on a metal film to cut it thin; on this occasion, the lead is curved only in one direction in the case where the two blades are urged on an identical surface, but it is curved in S-shape in the case where the two blades are urged on different surfaces.

In FIG. 5 (A), let L1 be a length (AB) of a line segment connecting one end (point A) of an arc in one direction of the curved surface of the lead A1 (K1) and a point (point B) in contact with the lead A1 (K1) as extending from the end (point A), and L2 be a maximum shortest distance (distance between point C and point D) from this line segment (AB) to the curved surface (bottom surface 7B) of the lead A1 (K1). When the curved surface is a circular arc, point D is an intersection between the curved surface and a center line passing a midpoint in the width direction.

Similarly, in FIG. 5 (B), let L1 be a length (XY) of a line segment connecting one end (point X) of an arc in one direction of the curved surface of the lead A1 (K1), and a point (point Y) in contact with the lead A1 (K1) as extending from the end (point X), and L2 be a maximum shortest distance (distance to a point W of a line segment normal to the line segment XY) from the line segment (XY) to the curved surface (bottom surface 7B) of the lead A1 (K1).

Similarly, as a supplementary explanation about a line segment TS, let L1 be a length (ST) of a line segment connecting one end (point S) of an arc in one direction of the curved surface of the lead A1 (K1), and a point (point T) in contact with the lead A1 (K1) as extending from the end (point S), and L2 be a maximum shortest distance (distance to a point R of a line segment normal to the line segment ST) from the line segment (ST) to the curved surface (top surface 7A) of the lead A1 (K1).

When each of the curved surfaces constituting the S-shape is a circular arc, intersections U, Z between center lines passing respective midpoints in the width direction and the top and bottom curved surfaces are inflection points of the respective curves.

When the lead produced by cutting with the blades is subjected to the aforementioned flattening process of the first step, the flatness of the top and bottom surfaces improves and in the cases of FIG. 5 (A) and FIG. 5 (B), a curvature rate R(=L2/L1) satisfies the relation of 0<R≦3%. A ratio α(=Z1/Z2) of the thickness Z1 near the central region of the lead to the thickness Z2 of the resin layers satisfies the relation of 30%≦α≦60%.

When the above numerical ranges are met, the ends A, X, S of the lead are prevented from becoming pointed even before the roll press processing, and the resin layers and the upper and lower metal films M1, M2 in specific ranges of thickness become less likely to be damaged.

In the case of the conventional technologies without the processing, as shown in (A) and (B) of FIG. 15, the lead A1 (K1) is largely curved and if the resin layers are thin, the lead A1 (K1) can break the resin layer in region J in the drawing to come into contact with the metal film M2, which could cause a leak of the liquid filled in the outer package or an electric short of the lead A1 (K1) through the metal film; whereas the aforementioned embodiment considerably improves such disadvantages because the top and bottom surfaces are comprised of the smooth curved surfaces.

In FIG. 5 (A), or in the section perpendicular to the longitudinal direction of the lead, let S1 be the area surrounded by the curved surface (bottom surface 7B) and the line segment (AB), and in FIG. 5 (B), or in the section perpendicular to the longitudinal direction of the lead, let S2 be the area surrounded by the curved surface (bottom surface 7B) and the line segment (XY). The conventional devices had the problem that these regions were less likely to be filled with the resin. On the other hand, the present invention involves the flattening process in the first step and the roll press process to obtain the convex surfaces in the second step, and the aforementioned areas S1, S2 vanish completely. Therefore, the region around the lead becomes more likely to be filled with the resin layer, thereby achieving an effect of improving hermetic sealing of the outer package.

Specifically, in the conventional technologies, as shown in FIG. 15 (C) and (D), the interior of the foregoing space was filled with gas AIR and if the internal pressure increased because of increase in temperature of the device or electrolysis of the electrolytic solution, a phenomenon of leakage of the gas or the electrolytic solution from the sealing region was observed; whereas the present embodiment remarkably improves such disadvantage.

Figure 6:
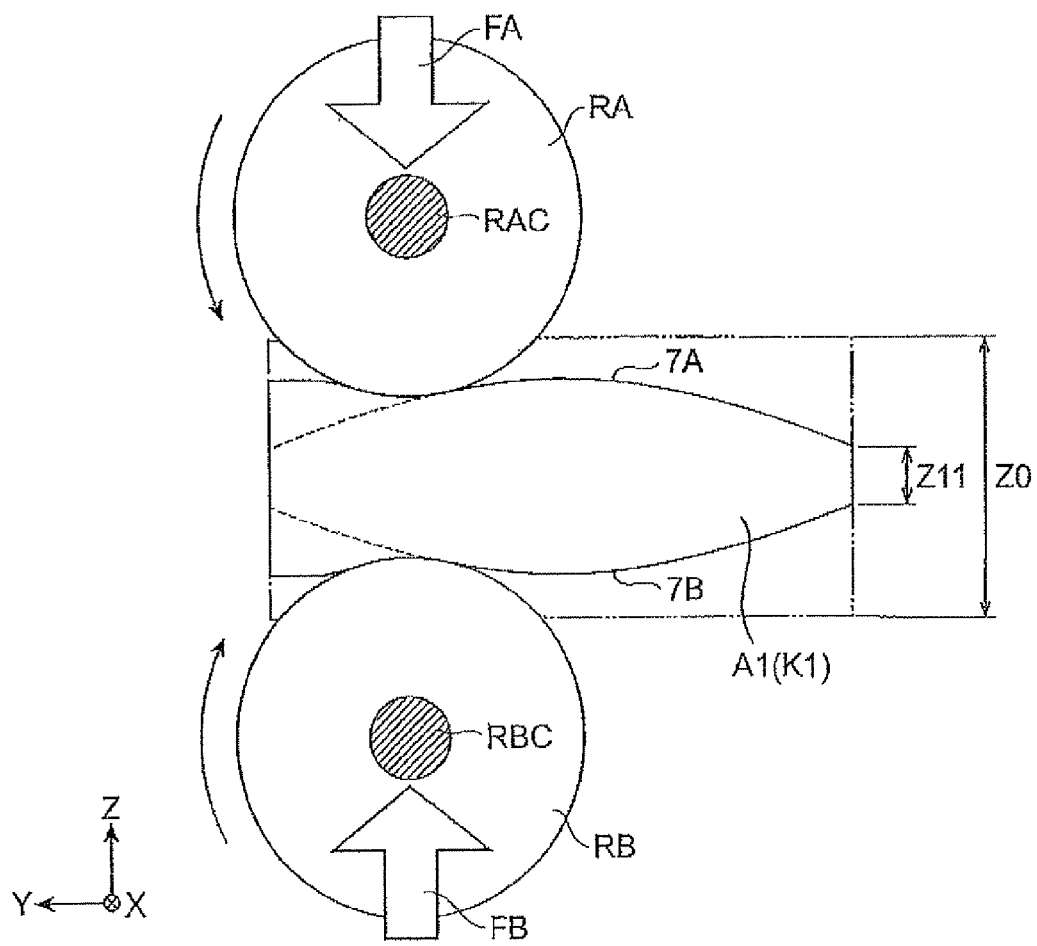
FIG. 6 is a vertical cross-sectional view of a lead under processing by roll press.

FIG. 6 is a vertical cross-sectional view of the lead under the roll press processing.

The rotation axes RAC, RAB of rolls RA, RB for press are parallel to the X-axis, the cylindrical peripheral surfaces of these are brought into contact with the top and bottom surfaces, respectively, of the lead A1 (K1), and forces FA, FB are applied in directions (Z-axis) toward the center in the thickness direction of the lead A1 (K1). The pressure $P_P$ applied on the top and bottom surfaces of the lead by the peripheral surfaces of the rolls is larger than the pressure $P_T$ during the thermocompression bonding of the outer package. With the pressure $P_P$ on the lead surfaces, the rolls RA, RB rotate in directions of arrows to roll on the lead surfaces and to move back and forth along the Y-axis directions. This operation results in deforming the sectional shape of the lead and completing the lead in the lens sectional shape (barrel shape). The lens section can be readily formed by such roll press processing.

Figure 7:
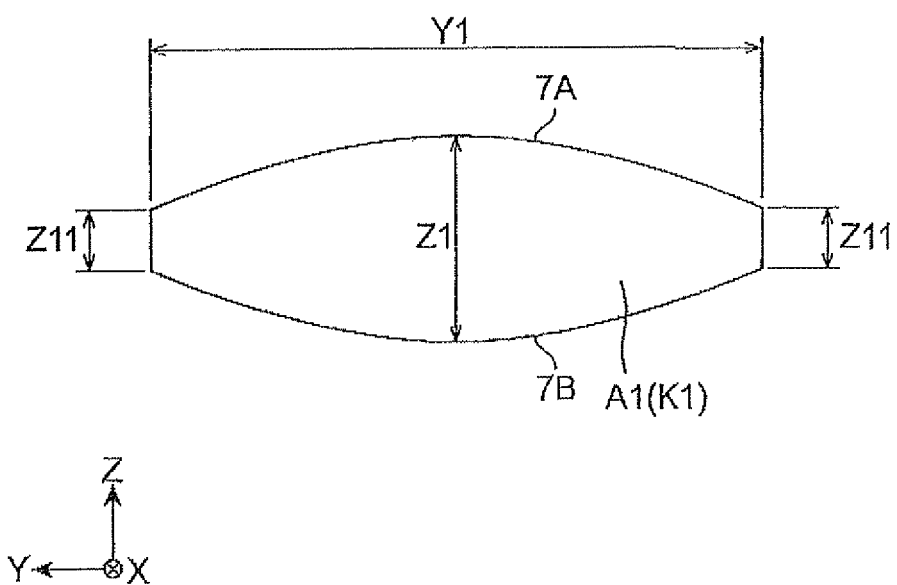
FIG. 7 is a vertical cross-sectional view of a lead processed by roll press.

FIG. 7 is a vertical cross-sectional view of the lead A1 (K1) after the roll press processing.

The lead A1 (K1) has the lateral length Y1, the end thickness Z11, and the thickness (maximum) Z1 near the central region, in the YZ section. As described above, the relation of 15 μm≦Z11 is met. Furthermore, Z1<Y1 and where each of the top and bottom surfaces is assumed to be a cylindrical surface, the center axis thereof is located outside the lead. Each of the corners at boundaries between the ends and the side faces is provided with a small curvature due to the roll press processing. In this case, a microscopic minimum end thickness (thickness at the extreme end position) is also adopted for the value of Z11, and if the microscopic thickness is continuously 0 μm so as to successively fail in determination of the end thickness, the end thickness Z11 may be defined at the end position 100 μm inside (toward the center) from the lateral edge giving the thickness of 0 μm.

Figure 8:
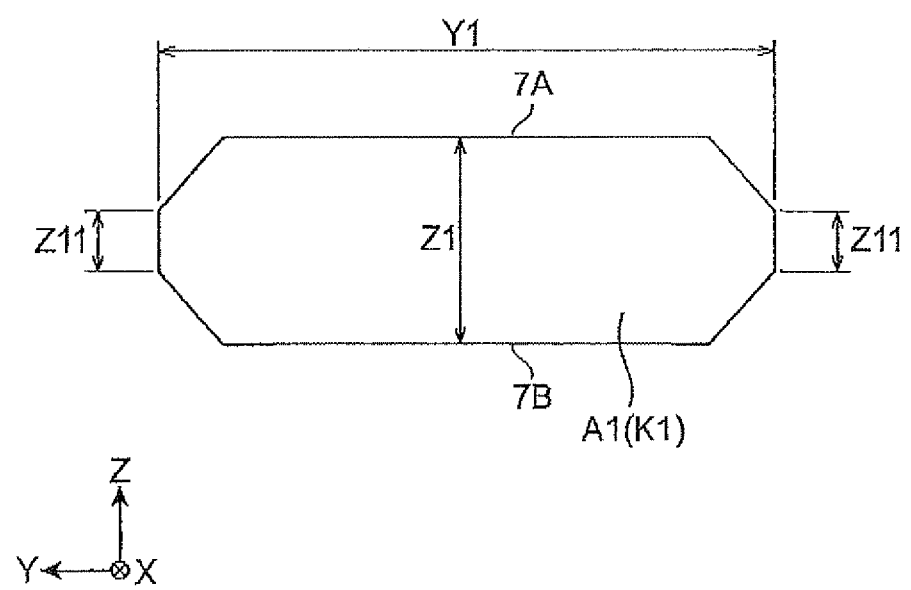
FIG. 8 is a vertical cross-sectional view of a lead obtained by cutting corners of lateral ends into planar shape.

FIG. 8 is a vertical cross-sectional view of a lead obtained by cutting the corners of the lateral ends into flat shape.

In this case where only the corners are cut off, the boundaries between one surface and the cutoff portions become discontinuously bent to leave substantially projecting portions, which could damage the surrounding resin layers. This is also the case in a configuration wherein the cutoff corner regions are taken large in the lateral direction so as to make the sectional shape tapered; there are projecting portions at boundaries.

On the other hand, there is no substantial projecting portion in the embodiment shown in FIG. 7. This makes the possibility of damaging the resin layers to cause a short between the leads through the aluminum film substantially zero in the thermocompression bonding with the resin layers (or in melting of resin). Furthermore, distances from the center to the peripheral surface of the lead shown in FIG. 7 become substantially almost uniform to increase the tolerance for change in rotational position around the axis of the lead, which further decreases the possibility of occurrence of a short during the thermocompression bonding.

A method for manufacturing the foregoing electrochemical device is as follows.

First, the leads A1, K2 are subjected to the flattening process with a press machine, as described above, and then subjected to the roll press processing. Next, the battery element 20 is prepared and the leads A1, K1 are connected to the positive and negative electrodes of the battery element. Next prepared are the metal films M1, M2 with the resin layers R1, R2 on their inner surfaces. The battery element 20 is put into the outer package P and the sealing region P1 on one side thereof is sealed by thermocompression bonding, while the remaining sealing regions are kept open as occasion may demand. Thereafter, the sealing regions of the remaining two portions of the outer package P including the foregoing members are sealed by thermocompression bonding while leaving the sealing region of the last side open; for example, at this stage, the electrolytic solution is poured through the opening sealing region into the outer package; after the pouring of the electrolytic solution, the sealing region of the remaining side is sealed by thermocompression bonding. This completes the electrochemical device 10.

As described above, the manufacturing method of the electrochemical device 10 of the above embodiment includes the step of pressing the regions of the leads A1, K1 located at least in the sealing region P1 (cf, FIG. 3), with the flat press surfaces (flat press) to improve the flatness of the leads A1, K1; the subsequent step of performing the roll press processing to deform the front and back surfaces of the leads into the curved surfaces; and the step of placing the leads A1, K1 after the roll press processing, between the resin layers R1, R2 in the sealing region P1 and performing the thermocompression bonding of these together with the outer package P.

In this case, the resin layers R1, R2 soften during the thermocompression bonding to adhere to the peripheries of the leads, and since the leads A1, K1 are preliminarily flattened by the flat press processing and further processed by the roll press, the resin layers are unlikely to be damaged and the adhesion of the leads to the resin layers R1, R2 is enhanced, thereby manufacturing the high-quality electrochemical device 10.

In the manufacturing method of the electrochemical device 10, the pressure $P_P$ in the press processing and the pressure $P_T$ in the thermocompression bonding satisfy the relation of $P_P > P_T$. Namely, the roll press is carried out at the pressure higher than that in the ordinary thermocompression bonding, which allows the leads to be deformed so as to form the curved surfaces.

The pressure $P_P$ in the press process and the pressure $P_T$ in the thermocompression bonding preferably satisfy the following conditions: $1.96 \times 10^5$ Pa $\leq P_P \leq 5.88 \times 10^5$ Pa and $0.98 \times 10^5$ Pa $\leq P_T \leq 3.92 \times 10^5$ Pa. This achieves an effect to reduce the short rate because the thermocompression bonding can be carried out while maintaining the lead shape in the press process of the leads.

As described above, the foregoing manufacturing method enables the device structure stable over time to be manufactured without formation of leak paths of the internal gas and electrolytic solution.

An appropriate material for the aforementioned metal foil leads is aluminum, but copper or the like is also applicable. An appropriate material for the resin layers R1, R2 is a polymer resin (polypropylene) being a thermally melting or thermoplastic resin, but it is also possible to use other resins. The foregoing electrochemical device is also applicable to the lithium-ion batteries and others except for EDLC.

EXPERIMENT EXAMPLES

Experiments to produce the foregoing electrochemical device experimentally were conducted. Examples will be explained below along with Comparative Examples.

Comparative Example 1

First, the electrochemical device was produced without execution of the flat press processing and roll press processing of tape-form leads. The material of the leads was aluminum (Al) with the width Y1=3.5 mm and the thickness Z0=100 μm, the leads were put into the outer package obtained by coating the internal surfaces of Al metal films with polypropylene resin layers (the thickness of each layer was 100 μm), and the thermocompression bonding was carried out (under conditions of 0.3 MPa, temperature 180°, and 7 seconds) to produce the electrochemical device (cell) without the electrolytic solution therein. This electrochemical device had the problem of a short between the leads because of damage of the resin layers. When the resistance between the lead terminals was less than 100 MΩ, a sample was defined as a defective product. In this case, where the number of samples was 50, the yield β1 was 60%.

Furthermore, the electrolytic solution for electric double layer capacitor (1.5 mol/L solution of TEA-BF4/acetonitrile) was poured into the outer package, and a charge-discharge test with the voltage of 2.5 V-1 V and the electric current of 50 mA was carried out in the temperature range of −40 to 80° C., resulting in leakage of the electrolytic solution from the lead portions. Each sample with an electrolytic solution weight reduction rate of less than 1% (or with no leakage trace) was defined as a nondefective product and the other samples over the rate were defined as defective products. Namely, when each sample with the electrolytic solution weight reduction rate of not less than 1% was defined as a defective product, 100% defective products were made with the sample number of 50, and the yield β2 in this case was 0%. "TEA-BF4" is tetraethylammonium tetrafluoroborate which is an electrolyte consisting of a quaternary ammonium salt.

Namely, the following results were obtained.
Z1=100 μm
Z11=100 μm
Z2=160 μm
Yield β1=60%
Yield β2=0%
Final yield β=β1×β2=0%

Example 1

In Example 1, the portions to be subjected to thermocompression bonding were subjected to the flat press processing (width 5 mm) and the roll press processing, as described above, under the same conditions as in Comparative Example 1. These press processes were carried out in the range to be subjected to the thermocompression bonding, under the pressure (0.4 MPa) higher than that in the thermocompression bonding (0.3 MPa) with the Al outer package carried out later. The press material used for these press processes was stainless steel. The flat press process of the first step decreased the thickness of the Al leads after the flattening process to 80 μm. The next roll press process deformed the leads to Z1=80 μm and Z11=40 μm.

Next, the thermocompression bonding of the lead sealing region was carried out in the same manner as in Comparative Example 1. The measurement of yield β1 was carried out without pouring the electrolytic solution into the outer package. The measurement of yield $\beta2$ was carried out after pouring the electrolytic solution into the package. In Example 1 all the conditions except for the lead press were the same as in Comparative Example 1.

As in Comparative Example 1, the electrolytic solution under the same condition was poured into the outer package and the charge-discharge test was carried out under the same condition. In this case, the yield $\beta1$ before injection of the electrolytic solution was improved to 100% and the resistance between the lead terminals of nondefective products was not less than 100 MΩ. With 50 samples, the defective rate with occurrence of liquid leakage after the injection was reduced to 0% and the yield $\beta2$ in this case was 100%.

Namely, the following results were obtained.
$Z1=80$ μm
$Z11=40$ μm
$Z2=200$ μm
Yield $\beta1=100\%$
Yield $\beta2=100\%$
Final yield $\beta=\beta1\times\beta2=100\%$ Similarly, the results of experiments with changes in values of $Z1$ and $Z11$ are as shown in FIG. 9. For each identical condition the number of samples is 20.

FIG. 9 is tables showing, yields (%) with changes in percentage (%) of thickness $Z11$ of the lateral end to thickness $Z1$, and in maximum thickness $Z1$ near the central region. (A) shows the cases where the thickness of the single resin layer is 80 μm (the total thickness $Z2=160$ μm), (B) the cases where the thickness of the single resin layer is 100 μm (the total thickness $Z2=200$ μm), and (C) the cases where the thickness of the single resin layer is 120 μm (the total thickness $Z2=240$ μm). Regardless of the resin, thickness, the good result is obtained in the cases where $Z11/Z1$ is not less than 40% and $Z1$ is not less than 80 μm; the good result is obtained in the cases where $Z11/Z1$ is not less than 50% and $Z1$ is not less than 60 μm; the good result is obtained in the cases where $Z11/Z1$ is not less than 60% and $Z1$ is not less than 60 μm the good result is obtained in the cases where $Z11/Z1$ is not less than 80% and $Z1$ is not less than 40 μm.

In FIG. 9, the experiment result (○ or ×) is given together with the yield $\beta1(\%)$. The experiment result (○) indicates the case where the yield $\beta1$ is not less than 65% and the experiment result (×) the case where the yield $\beta1$ is less than 65%. As described above, the defective product was defined as a sample with the resistance between the leads being less than 100 MΩ because of a short between the leads, and the nondefective product as a sample with the resistance of not less than 100 MΩ.

Figure 10:
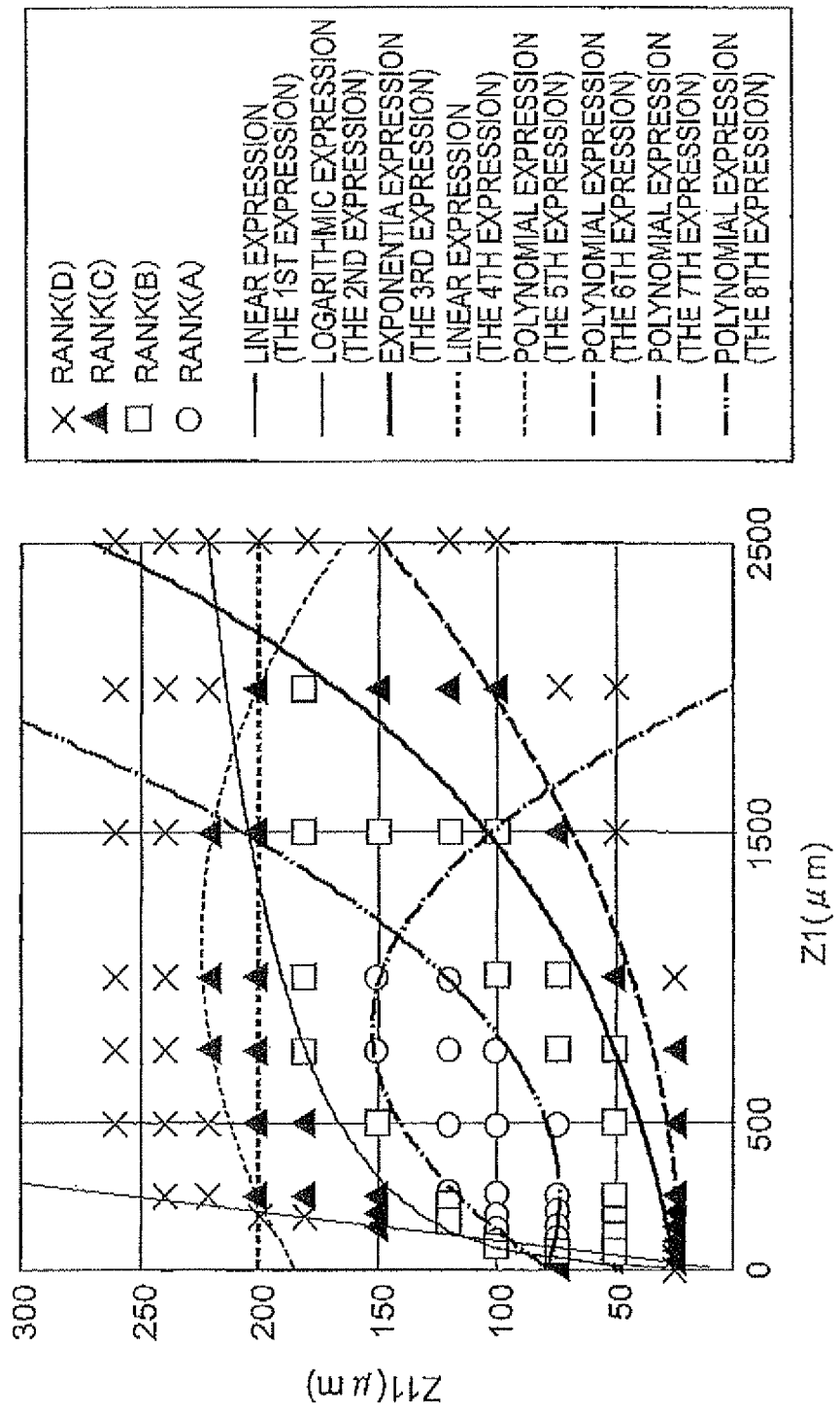
FIG. 10 is a graph showing relations of yields β in the case of thickness Z1 versus thickness Z11 of the lateral end.

FIG. 10 is a graph showing the relation of yield $\beta$ in the case of the thickness $Z1$ versus the thickness $Z11$ of the lateral end, including functions to define ranks (RANK (A) to RANK (D)) of various qualities.

Each RANK is defined as follows.

RANK (A): the cases where the yield is highest and the yield $\beta$ is not less than 70%.

RANK (B): the cases where the flattening effect of the first step is dominant, there is no effect by making the ends thinner by the second step, and the yield $\beta$ is not less than 40%, and less than 70%.

RANK (C): the cases where the leads are likely to be cut in the thermocompression bonding and the yield $\beta$ is not less than 20%, and less than 40%.

RANK (D): the cases where the leads are cut 100% in the thermocompression bonding and the yield $\beta$ is not less than 0%, and less than 20%.

FIG. 11 shows the data of p in the cases of RANK (A), FIG. 12 the data of $\beta$ in the cases of RANK (B), FIG. 13 the data of $\beta$ in the cases of RANK (C), and FIG. 14 the data of $\beta$ in the oases of RANK (D), in which the conditions except for the values of $Z1$ and $Z11$ are the same as in Example 1.

$Z1$ and $Z11$ satisfy the following relational expression or expressions in each of the ranks.

The range of RANK (A) can be expressed by the range satisfying all of the expressions below (the first expression, seventh expression, and eighth expression). $Z1$ can satisfy at least the range of 10 to 1000 μm.

| | |
|---|---:|
| $Z11<Z1$ | First Expression |
| $Z11\leq-1.09\times10^{-4}Z1^2+0.18Z1+78.1$ | Seventh Expression |
| $Z11\geq8.39\times10^{-5}Z1^2-4.17\times10^{-2}Z1+79.4$ | Eighth Expression |

The range of RANK (B) can be expressed by the range satisfying all of the expressions below (the first expression, second expression, third expression, and fourth expression) and range excluded from the set of RANK (A) (which is a complementary set of RANK (A)). $Z1$ can satisfy at least the range of 10 to 2000 μm.

| | |
|---|---:|
| $Z11<Z1$ | First Expression |
| $Z11<34.54\times\ln(Z1)-48.87$ | Second Expression |
| $Z11>25\times\exp(9.51\times10^{-4}Z1)$ | Third Expression |
| $Z11<200$ | Fourth Expression |

The range of RANK (C) can be expressed by the range satisfying all of the expressions below (the first expression, fifth expression, and sixth, expression) and range excluded from the both sets of RANK (A) and RANK (B) (which is a complementary set of a union of RANK (A) and RANK (B)). $Z1$ (μm) can satisfy at least the range of 10 to 2000 μm.

| | |
|---|---:|
| $Z11<Z1$ | First Expression |
| $Z11\geq-3.20\times10^{-5}Z1^2+7.20\times10^{-2}Z1+184$ | Fifth Expression |
| $Z11\geq1.98\times10^{-5}Z1^2+4.72\times10^{-4}Z1+23.5$ | Sixth. Expression |

The range of RANK (D) can be expressed by the range satisfying the expression below (the first expression) and range excluded from all the sets of RANK (A), RANK (B), and RANK (C) (which is a complementary set of a union of RANK (A), RANK (B), and RANK (C)). $Z1$ (μm) can satisfy at least the range of 10 to 2500 μm.

| | |
|---|---:|
| $Z11<Z1$ | First Expression |

For the thick leads with $Z1$ (μm)=100-2500 μm, the yield can also be improved to some extent by the thinning process of the edge portions. Since the disadvantage as described above occurs with the is thickness $Z11$ (μm) of less than 15 μm, the experiments were carried out with the thickness $Z11$ of not less than 25 μm.

These expressions satisfy the experiment results of FIG. 9,

Comparative Example 2

When compared with Comparative Example 1, the leads were produced in the reduced thickness of 80 μm by carrying out only the flat press processing in the same manner as in Example 1. Each of the leads was cut at the four corners in the lateral direction as shown in FIG. 8, whereby the leads were produced in an octagonal cross section with $Z1$ (μm)=80 μm and $Z11$ (μm)=40 μm. The experiments were carried out under the same conditions as in Comparative Example 1, except for the above. The yield $\beta1$ in this case was 80%. However, $\beta2$ was 70% because the roll press process was not carried out. A conceivable reason for it is that the number of edges increases (because of the octagonal cross section) to increase the probability of penetration and short, so as to result in decrease in yield when compared with the lens shape of the smooth cross section. Further conceivable reasons are that it is difficult to completely remove particles made during cutting and they adhere to the lead surfaces to be a cause of penetration.

In the above example, the flat press processing of the aluminum foil leads decreases curvature and bending of the aluminum foil leads, and crashes burrs, and the roll press processing remarkably decreases sharpness of the surfaces; as a result, the pressure is also uniformly applied on the aluminum foil leads during the thermocompression bonding of the aluminum outer package and it is thus considered that penetration of the lead through the resin layer was decreased (to achieve decrease of short). In the case of the example, adhesion to the resin layers is enhanced, so as to decrease the gas/liquid leak.

What is claimed is:

1. An electrochemical device comprising:
    an outer package including a metal film;
    a battery element enclosed in the outer package;
    resin layers provided at least inside a sealing region of the outer package; and
    a lead extending from the battery element through between the resin layers in the sealing region of the outer package to the outside of the outer package,
    wherein:
    a shape of the lead in the sealing region includes a front surface and a back surface comprising first and second curved surfaces, respectively, which are opposed to each other,
    a first intersecting line between the first surface and a plane perpendicular to a longitudinal direction of the lead comprising a continuous first curve convex in a direction away from the lead, and
    a second intersecting line between the second surface and the plane perpendicular to the longitudinal direction of the lead comprising a continuous second curve convex in a direction away from the lead,
    in the sealing region, a maximum thickness $Z1$ (μm) of the lead near a lateral center position of the lead and a thickness $Z11$ (μm) at a lateral end position of the lead satisfy the following relational expression $Z11<Z1$, and the thickness $Z11$ (μm) is not less than 15 (μm).

2. The electrochemical device according to claim 1, wherein $Z1$ (μm) and $Z11$ (μm) satisfy the following relational expressions:

$$Z11 \geq -3.20 \times 10^{-5} Z1^2 + 7.20 \times 10^{-2} Z1 + 184;$$

$$Z11 \geq 1.98 \times 10^{-5} Z1^2 + 4.72 \times 10^{-4} Z1 + 23.5.$$

3. The electrochemical device according to claim 1, wherein $Z1$ (μm) and $Z11$ (μm) satisfy the following relational expressions:

$$Z11 < 34.54 \times \ln(Z1) - 48.87;$$

$$Z11 > 25 \times \exp(9.51 \times 10^{-4} Z1);$$

$$Z11 < 200.$$

4. The electrochemical device according to claim 1, wherein $Z1$ (μm) and $Z11$ (μm) satisfy the following relational expressions:

$$Z11 \leq -1.09 \times 10^{-4} Z1^2 + 0.18 Z1 + 78.1;$$

$$Z11 \geq 8.39 \times 10^{-5} Z1^2 - 4.17 \times 10^{-2} Z1 + 79.4.$$

5. A method for manufacturing the electrochemical device as defined in claim 1, the method comprising:
    a step of processing at least a region of the lead located in the sealing region, by roll press to deform the front surface and the back surface of the lead into the curved surfaces; and
    a step of placing the lead with the front surface and the back surface of the curved surfaces, between the resin layers in the sealing region, and performing thermocompression bonding of the lead and the resin layers together with the outer package.

6. The method according to claim 5, wherein a pressure $P_P$ in the processing by roll press and a pressure $P_T$ in the thermocompression bonding satisfy the following relation: $P_P > P_T$.

* * * * *